United States Patent
Hansen (10) Patent No.: US 9,302,794 B2
(45) Date of Patent: Apr. 5, 2016

(54) METHOD FOR PRODUCING AND FILLING CONTAINERS MADE OF THERMOPLASTIC WITH A CONTAINER VOLUME DISPLACEMENT STEP

(76) Inventor: Bernd Hansen, Sulzbach-Laufen (DE)

( * ) Notice: Subject to any disclaimer, the term of this patent is extended or adjusted under 35 U.S.C. 154(b) by 284 days.

(21) Appl. No.: 13/261,569

(22) PCT Filed: Jun. 30, 2011

(86) PCT No.: PCT/EP2011/003245
§ 371 (c)(1),
(2), (4) Date: Feb. 22, 2013

(87) PCT Pub. No.: WO2012/019672
PCT Pub. Date: Feb. 16, 2012

(65) Prior Publication Data
US 2013/0146499 A1 Jun. 13, 2013

(30) Foreign Application Priority Data
Jul. 20, 2010 (DE) .......................... 10 2010 027 617

(51) Int. Cl.
*B65B 3/18* (2006.01)
*B65D 81/18* (2006.01)
(Continued)

(52) U.S. Cl.
CPC . *B65B 3/18* (2013.01); *B65B 3/022* (2013.01); *B65D 1/0276* (2013.01); *B65D 1/0292* (2013.01); *B65D 81/18* (2013.01); *B29C 49/04* (2013.01); *B29C 49/541* (2013.01)

(58) Field of Classification Search
CPC ............ B65B 3/02; B65B 3/022; B65B 3/18; B65B 3/045; B65B 7/16; B65B 7/161; B65B 51/142; B65D 81/18; B29C 49/04; B29C 49/30; B29C 49/42; B29C 49/4802; B29C 49/541; B67C 3/222; B67C 3/223; B67C 2003/227
USPC ........... 53/423, 452–454, 457, 558, 559, 561, 53/563, 574, 578, 268, 269, 285; 215/47–49
See application file for complete search history.

(56) References Cited

U.S. PATENT DOCUMENTS 2,872,760 A * 2/1959 Meissner .......................... 264/4
3,897,670 A * 8/1975 Hansen ........................... 53/453
(Continued)

FOREIGN PATENT DOCUMENTS

AT  369 991 B    2/1983
DE  697 25 207 T2  5/2004
(Continued)

*Primary Examiner* — Stephen F Gerrity
*Assistant Examiner* — Joshua Kotis
(74) *Attorney, Agent, or Firm* — Wenderoth, Lind & Ponack, L.L.P.

(57) ABSTRACT

A method produces and fills containers (1) made of thermoplastic plastic, in which an extruded plastic hose is inserted into an open mold having movable mold parts. The mold parts forming the container (1) are closed. The hose is expanded by a pressure gradient acting on the hose to form the container (1), preferably in the form of a bellows. The container is filled with filling material. The level of the filling material is raised by reducing container volume in the direction of the container opening. A container closure (5) for the container opening is formed from the hose by closing head jaws of the mold. In the region of the container closure (5), one section of the plastic hose remains unclosed to form a venting cannula (3). When the container volume is reduced, the level of the filling material is raised such that at least air is displaced from the container (1) through venting cannula (3). The venting cannula (3) is closed by closing auxiliary head jaws.

6 Claims, 6 Drawing Sheets

(51) Int. Cl.
  *B65B 3/02* (2006.01)
  *B65D 1/02* (2006.01)
  *B29C 49/04* (2006.01)
  *B29C 49/54* (2006.01)

(56) References Cited

U.S. PATENT DOCUMENTS

| | | | | |
|---|---|---|---|---|
| 3,911,071 A | * | 10/1975 | Naumann | 264/524 |
| 4,054,017 A | * | 10/1977 | Naumann | 53/511 |
| 4,604,850 A | * | 8/1986 | Reil | 53/423 |
| 4,834,823 A | * | 5/1989 | Reil | 156/217 |
| 4,905,450 A | * | 3/1990 | Hansen et al. | 53/410 |
| 4,926,613 A | * | 5/1990 | Hansen | 53/433 |
| 5,158,192 A | * | 10/1992 | Lataix | 215/48 |
| 5,901,865 A | * | 5/1999 | Weiler et al. | 215/48 |
| 6,197,936 B1 | * | 3/2001 | Sano et al. | 530/363 |
| 6,214,282 B1 | * | 4/2001 | Katou et al. | 264/524 |
| 6,381,926 B1 | * | 5/2002 | Weiler et al. | 53/452 |
| 7,192,549 B2 | * | 3/2007 | Hansen | 264/524 |
| 7,744,365 B2 | * | 6/2010 | Maddox | 425/522 |
| 2009/0181197 A1 | * | 7/2009 | Hansen | 428/35.7 |

FOREIGN PATENT DOCUMENTS

| | | | |
|---|---|---|---|
| DE | 10 2008 004 088 A1 | | 7/2008 |
| DE | 10 2008 004 088 A1 | | 7/2009 |
| GB | 1485058 A | * | 9/1977 |
| JP | 8 244749 A | | 9/1996 |
| WO | WO 2009/086864 | | 7/2009 |

* cited by examiner

Fig. 12

METHOD FOR PRODUCING AND FILLING CONTAINERS MADE OF THERMOPLASTIC WITH A CONTAINER VOLUME DISPLACEMENT STEP

REFERENCE TO RELATED APPLICATIONS

This application is the U.S. national phase of PCT/EP2011/003245, filed Jun. 30, 2011, that claims priority to German Application No. 10 2010 027 617.0, filed Jul. 20, 2010.

FIELD OF THE INVENTION

The invention relates to a method for producing and filling containers made of thermoplastic plastic. An extruded plastic tube is inserted into an open mold having movable mold parts. The mold parts forming the container are then closed, with the tube expanded by a pressure gradient acting on the tube to form the container, preferably in the form of a bellows. After the container is filled with a filling material, the level of the filling material is raised by displacing the container volume in the direction of the container opening. A container closure for the container opening is formed from the tube by closing the head jaws of the mold. Furthermore, the invention relates to a device for carrying out the method and to a container that is produced in that way.

BACKGROUND OF THE INVENTION

Methods of this type, such as the Bottelpack® system, are widely used to produce containers of various shapes, sizes, and for different purposes. In this case, they can also be co-extruded containers. In particular, they can be transparent, flexible containers made of polyethylene or polypropylene. In many cases, the containers are both produced and filled with a sterile filling material, such as pharmaceuticals, and sealed in an aseptic operation in one working step. That method is disclosed in WO 2009/086864 A1.

When such containers are used in medicine, an essential performance characteristic is that the filling material can be removed in a suitable manner. If the filling material is, for example, a liquid that is to be infused, for example, an anesthetic, then it must be ensured that the container contains only a minimal residual volume of air, so that when the liquid is squeezed out by squeezing the flexible container, a highly accurate dosage of the liquid is delivered.

SUMMARY OF THE INVENTION

With respect to these requirements, an object of the present invention is to provide an improved method for producing containers that can be filled, with almost no air, in an economical and efficient way.

The invention basically achieves this object by a method for molding the container closure from the plastic tube being carried out such that one section of the plastic tube remains unclosed and such that a venting cannula is formed. In the same or in an additional displacement step, in which the level of the filling material is raised as required, the residual volume of air is displaced at this point from the container through the venting cannula. Thereafter, the venting cannula and the container are closed by closing the head jaws or the auxiliary head jaws of the mold. When the liquid level is raised in this way, essentially no air or only a small volume of air remains inside the container after the venting cannula has been closed. Then the venting cannula itself or sections thereof can be removed along with the rest of the scraps. In one particular embodiment, the level could also be raised further or could be raised until the liquid is displaced through the respective venting cannula to the exterior. This displacement would then result in a container having contents that are totally free of air.

If the venting cannula is formed at the upper end of the container closure, any relevant residual volume of air can be removed without having to displace the contents as far as into the venting cannula.

Preferably, the venting cannula is closed directly at the wall of the container closure by the auxiliary head jaws, so that the venting cannula can be severed directly at the container closure. As a result, a larger, protruding remaining portion of the cannula does not remain at the container closure. This approach permits proceeding in such an advantageous way that the venting cannula is not only closed by the auxiliary head jaws, but at the same time is also severed at the closing point or the welding spot. The auxiliary head jaws close the venting channel, and thus, create a thin section in the material, adjoining the container closure, by the cutting edges. The head flash together with the former venting channel can then be removed in a stamping operation that takes place after the demolding process.

Preferably, the venting cannula is formed from a section of the plastic tube that is located outside the central region of the container closure. This arrangement allows, in an advantageous way, the central region of the container closure to remain without an attachment point or welding spot of the venting cannula. The applicability of the container closure as an infusion connecting head is then not adversely affected.

The subject matter of the invention is also a device for carrying out the method. This device has movable mold parts for forming a container from an extruded plastic tube. In this case, the closing surfaces of the main head jaws of the mold that form the container closure have recesses that leave a section of the plastic tube unclosed to form a venting cannula. The auxiliary head jaws, which can be moved relative to the main head jaws, can be moved into an active position that closes the venting cannula.

At the same time, the arrangement is configured preferably with the auxiliary head jaws being integrated into the main head jaws such that these auxiliary head jaws penetrate the recesses and can be moved into the active position in the direction of the closing motions of the main head jaws.

The auxiliary head jaws can be moved in an especially advantageous way by working cylinders located in the main head jaws and actuated by pressurizing media. In addition or as an alternative, servo motors can replace the working cylinders.

Furthermore, the subject matter of the invention includes an air-free container produced according to the inventive method by the device according to the invention. The container has a closed attachment point of a severed venting cannula.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
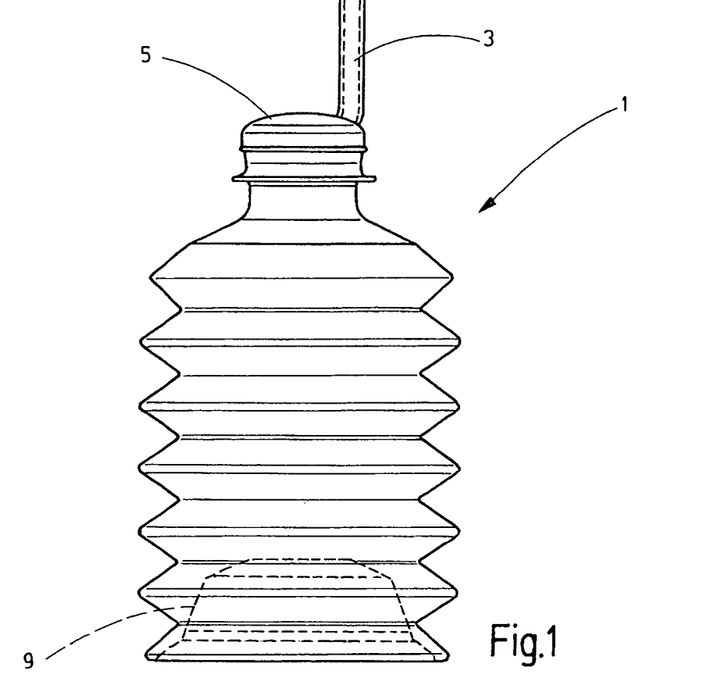
FIG. 1 is a side elevational view of a container, drawn slightly smaller in size compared to a practical embodiment, produced according to an exemplary embodiment of the invention in the form of a bellows, which bellow can be axially pressed together before severing the venting cannula.
Figure 2:
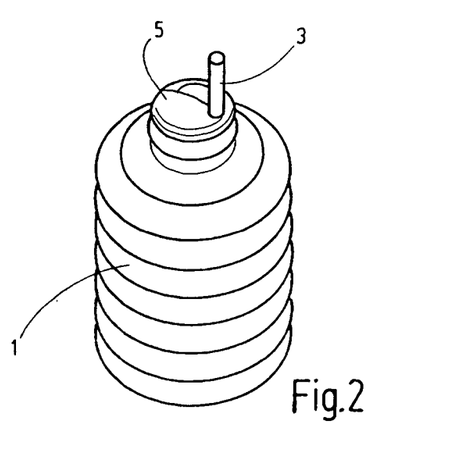
FIG. 2 is a perspective view of the container that is scaled down compared to the container shown in FIG. 1.
Figure 3:
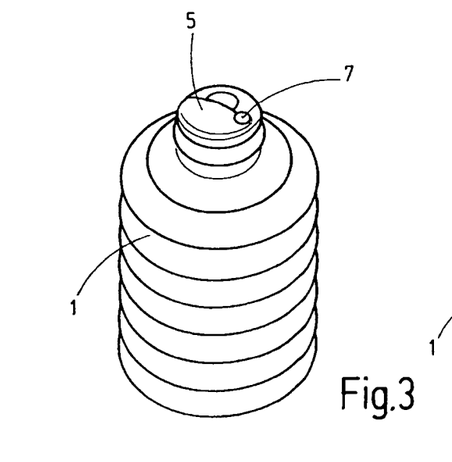
FIG. 3 is a perspective view of the container of FIG. 2, after the venting cannula has been severed.

The invention is explained below by the example of a container 1 configured as a bellows and shown in detail in FIGS. 1 to 3. The invention can also be used just as advantageously for the production of containers with smooth walls. FIGS. 1 and 2 show the container 1 in an unfinished state, in which it is removed from a blow molding machine, with the venting cannula 3 not closed and not severed from the container closure 5. FIG. 3 shows the finished state, in which the venting cannula 3 has been severed from the container closure 5 at a welding spot or attachment point 7. The venting cannula 3, and thus, the attachment point 7 are located at a point that is moved outside of or spaced laterally from the central region or axis of the container closure 5.

FIG. 1 shows that the bottom of the container 1 is not formed flat, but rather exhibits a convexity 9 toward the inside. When the liquid is dispensed from the container 1, the liquid can be displaced from the container 1 by squeezing the bellows, so that no residual volume of liquid remains, because the convexity 9 forms a displacer body that compensates for the dead length that remains when the bellows is pressed completely together.

Figure 4:
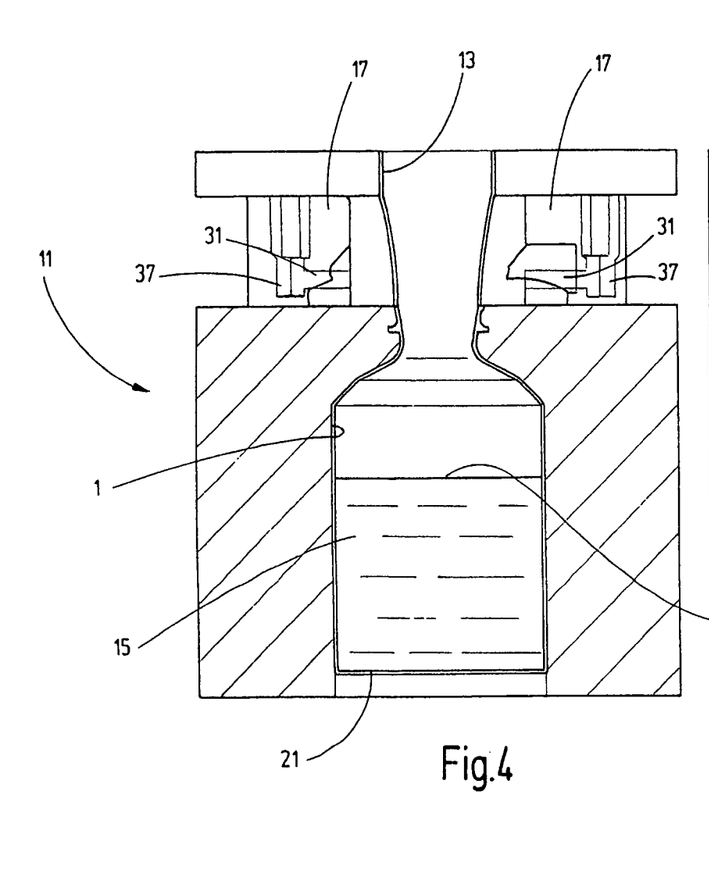
FIG. 4 is a simplified, side elevational view in section in schematic form of a partially closed blow mold according to an exemplary embodiment of the invention, with the container formed therein in the operating state of filling the container with filling material and in the operating state of the head jaws of the mold that form the container closure in the open position.
Figure 5:
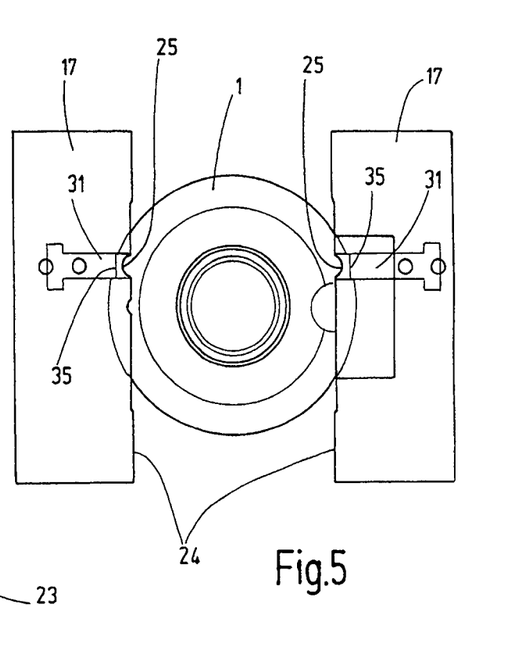
FIG. 5 is a simplified top plan view in schematic form of the blow mold of FIG. 4, where only the open head jaws of the mold parts are visible.
Figure 6:
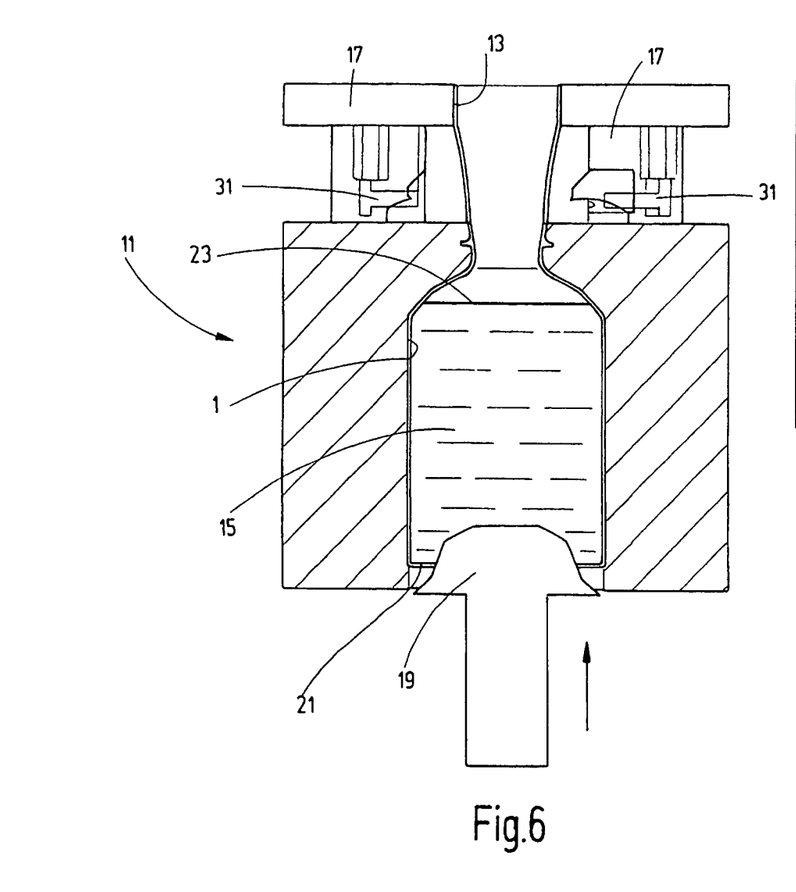
FIG. 6 is a side elevational view in section of the blow mold of FIG. 4, but with the fill level of the filling material raised in a first displacement step.
Figure 7:
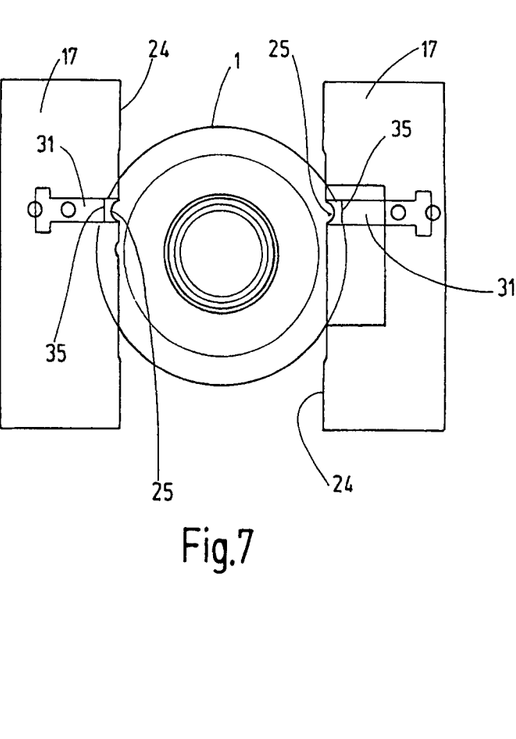
FIG. 7 is a top plan view of the blow mold of FIG. 6.

FIGS. 4 to 13 show the sequence of the method according to the invention carried out on the basis of the known Bottel-pack® system. In this context, FIGS. 4 and 5 show the container 1 formed from a plastic tube 13 in a blow mold 11, while filling the container with liquid filling material 15. In this case, the movable main head jaws 17 of the blow mold 11 are located in the open position, so that the container closure has not been formed yet by these head jaws 17, and therefore, the container 1 is still open. FIGS. 6 and 7 show a first displacement step, wherein a displacer plunger 19 displaces the container volume starting from the direction of the bottom 21, so that the liquid level 23 of the filling material 15 rises to the mid-level height shown in FIG. 6. Once again, the head jaws 17 are located in the open position. The top view in FIG. 7 corresponds to the top view from FIG. 5.

Figure 8:
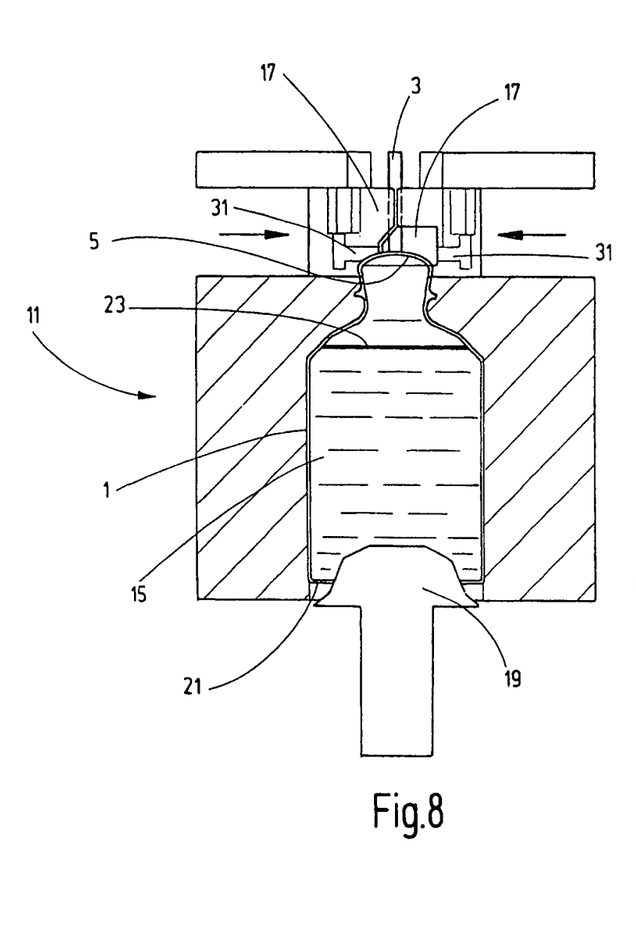
FIG. 8 is a side elevational view in section of the blow mold of FIG. 6, but with the head jaws of the mold are closed to form a container closure and a venting cannula from the plastic tube.
Figure 9:
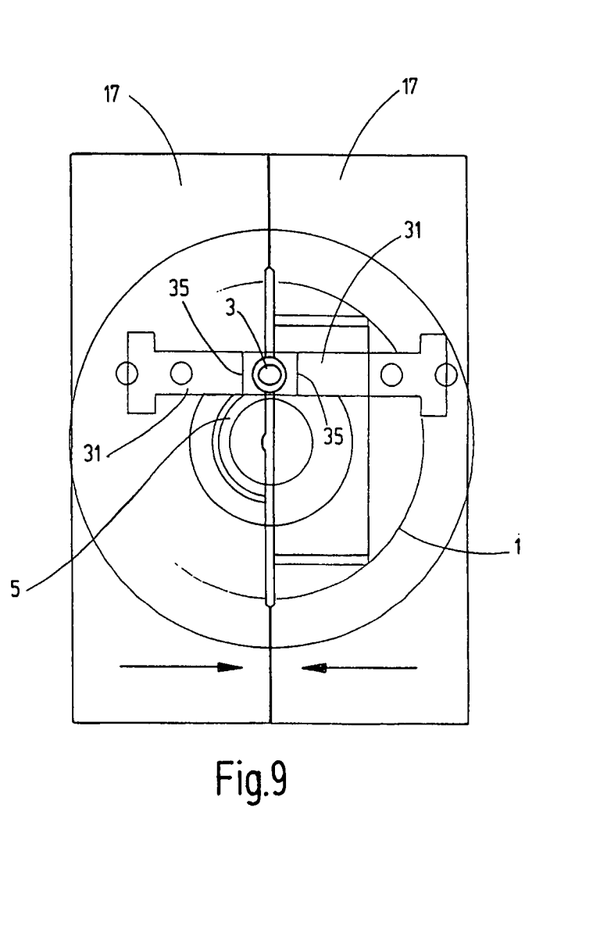
FIG. 9 is a top plan view of the blow mold of FIG. 8, but drawn to a larger scale.

As apparent from FIGS. 5 and 7, the closing surfaces 24 of the head jaws 17 have semi-cylindrical recesses 25 that face each other. When the head jaws 17 are moved toward each other, as illustrated by the arrows in FIG. 8 and, as a result, a container closure 5 is formed from the plastic tube 13 (see FIGS. 8 and 9), that section of the plastic tube 13 that may be found in the recesses 25 remains unclosed, so that the venting cannula 3, shown in FIGS. 1 and 2, is formed. The recesses 25 are located outside of or spaced laterally from the central region of the head jaws 17 (see FIGS. 5 and 7), so that the venting cannula 3 opens eccentrically on the container closure 5.

Figure 10:
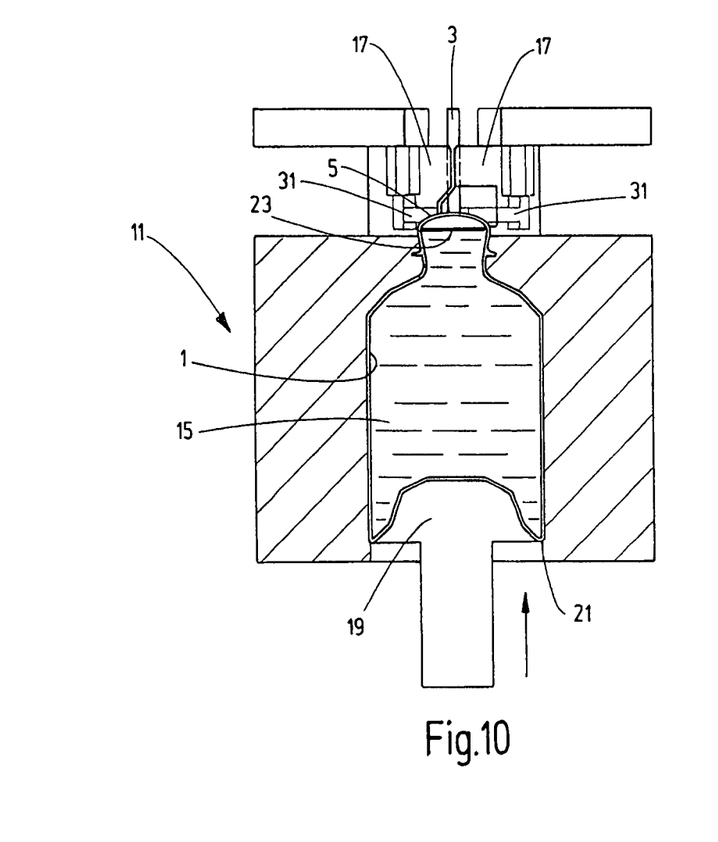
FIG. 10 is a side elevational view in section of the blow mold of FIG. 8, but with the fill level of the filling material raised further in a second displacement step.
Figure 11:
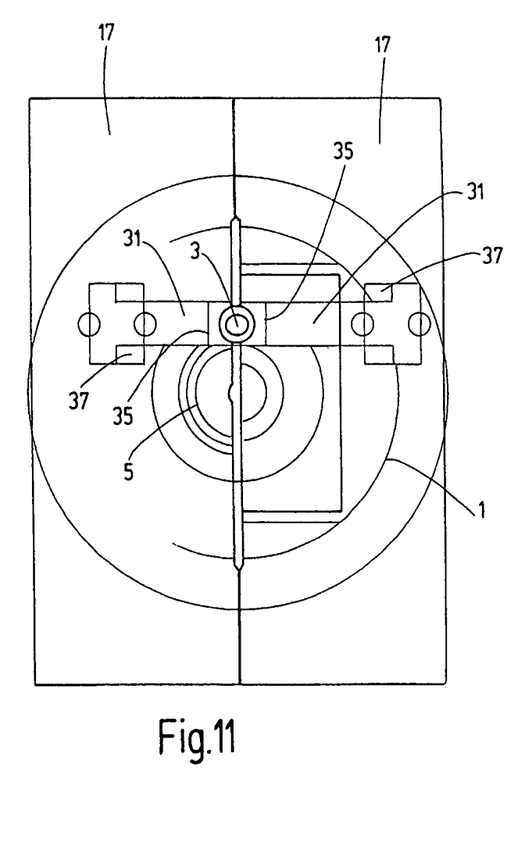
FIG. 11 is a top plan view of the blow mold of FIG. 10 but drawn on a larger scale.

FIGS. 10 and 11 illustrate a state in which a second displacement step is carried out by the displacer plunger 19 after the formation of the container closure 5 and the venting cannula 3, while the head jaws 17 are still closed. The liquid level 23 then rises as far as up to the vicinity of the opening region of the venting cannula 3 inside the container closure 5, while the air flows out of the container 1 through the venting cannula 3. As a result, the container 1 is practically free of a residual air volume.

Figure 12:
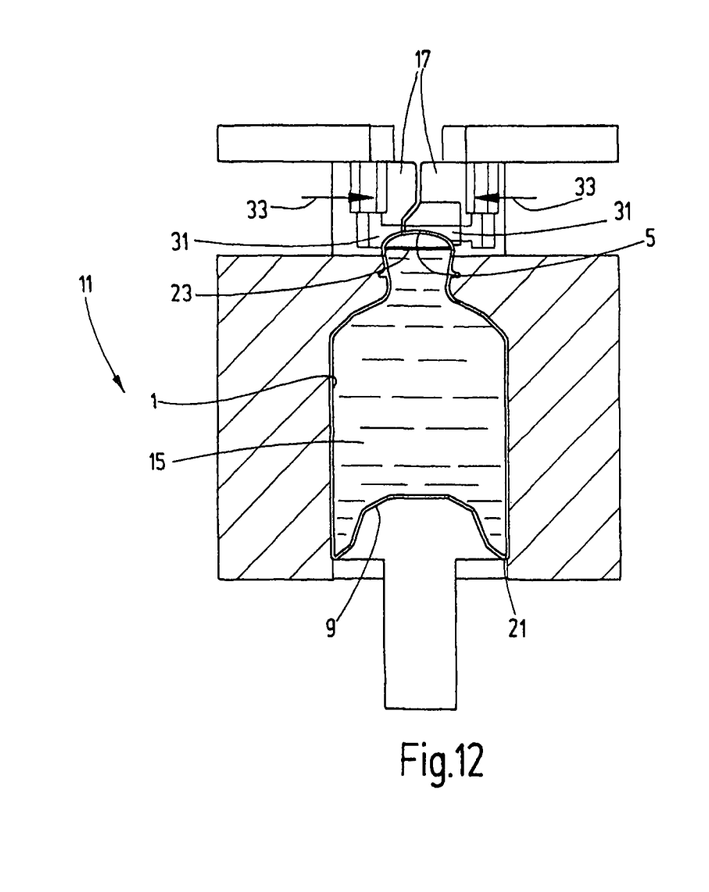
FIG. 12 is a side elevational view in section of the blow mold of FIG. 10, with the auxiliary head jaws shown closed and the venting cannula closed and severed by the auxiliary head jaws.
Figure 13:
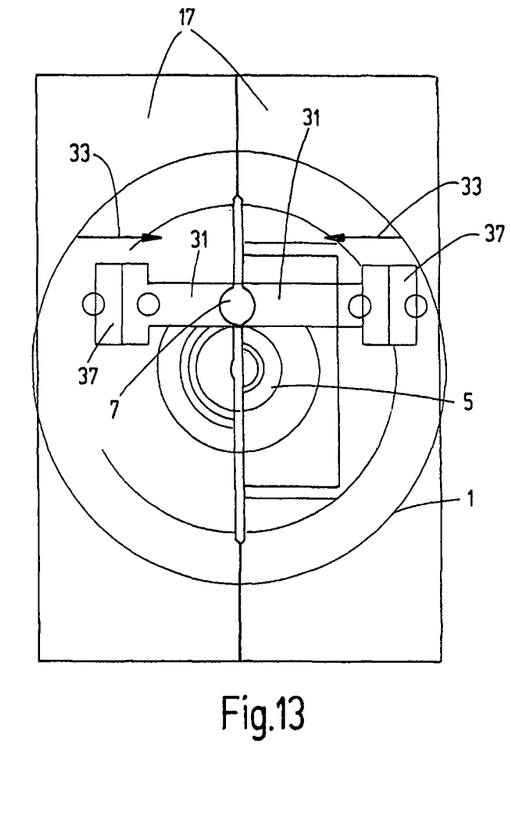
FIG. 13 is a top plan view of the blow mold of FIG. 12, but drawn on a larger scale, showing the auxiliary head jaws in the closed position.

Having reached this state, the venting cannula 3 is closed, as shown in FIGS. 12 and 13. This closing is performed by the auxiliary head jaws 31 that are integrated into the head jaws 17. As shown with the motion arrows 33 in FIGS. 12 and 13, these auxiliary head jaws can be moved toward each other. The auxiliary head jaws 31 have welding edges 35 that perform a closing and severing action at the venting cannula 3, so that the venting cannula 3 is severed from the container closure 5 at the attachment point 7. The auxiliary head jaws 31 are actuated by actuating cylinders 37 (FIG. 13), which actuating cylinders can be actuated by pressurized media.

While various embodiments have been chosen to illustrate the invention, it will be understood by those skilled in the art that various changes and modifications can be made therein without departing from the scope of the invention as defined in the appended claims.

What is claimed is:

1. A method of producing and filling containers made of thermoplastic material, comprising the steps of:
   inserting an extruded plastic tube into an open mold having movable mold parts,
   closing the mold parts with the plastic tube therein,
   expanding the plastic tube by a pressure gradient acting on the plastic tube to form a container,
   filling the container with filling material to a level in the container,
   raising the level of the filling material in the container by displacing a container volume by moving a displacer a first time to a first position,
   forming a container closure from the plastic tube by closing main head jaws of the mold, with recesses in the main head jaws remaining open and forming at least one open venting cannula from a part of the plastic tube located in the recesses while the displacer is in the first position, raising the level of the filling material in the container by displacing the container volume by moving the displacer a second time to a second position spaced from the first position, with air being displaced from the container through the open venting cannula, and closing the venting cannula by closing auxiliary head jaws of the mold.

2. The method according to claim 1 wherein
the venting cannula is formed in a region of an upper end of the container closure.

3. The method according to claim 2 wherein
the venting cannula is closed directly at an exterior of the container closure by the auxiliary head jaws.

4. The method according to claim 3 wherein
the venting cannula is severed directly at a wall of the container closure by the auxiliary head jaws.

5. The method according to claim 1 wherein
the venting cannula is formed from a section of the plastic tube laterally offset from a central axis of the container closure.

6. The method according to claim 1 wherein
the container volume is displaced by the displacer producing a convexity on a bottom of the container extending into an interior of the container.

\* \* \* \* \*